April 23, 1957 C. H. HAYNES ET AL 2,790,066
STUD WELDER
Filed Aug. 13, 1954 2 Sheets-Sheet 1

INVENTOR.
LORENZ JOHN MOWRY
CLYDE H. HAYNES
BY
*Clyde H Haynes*
their atty

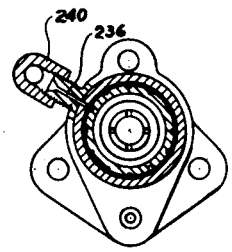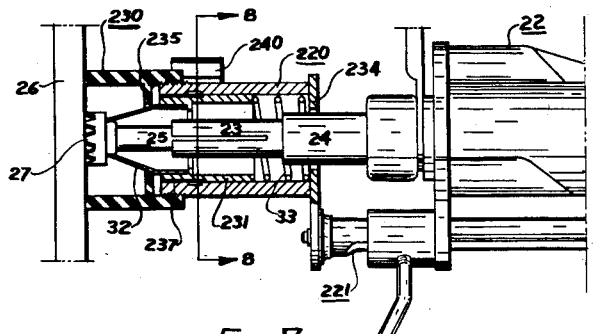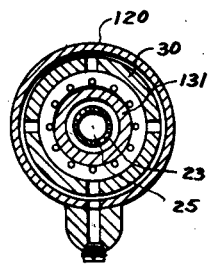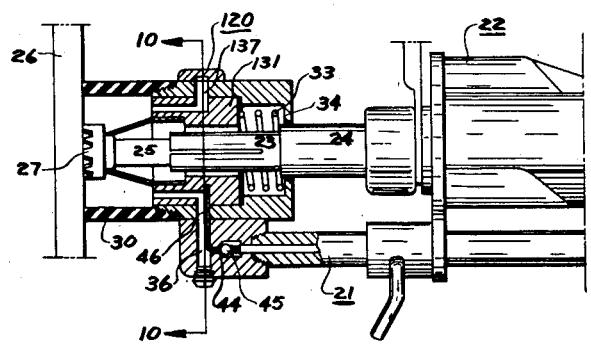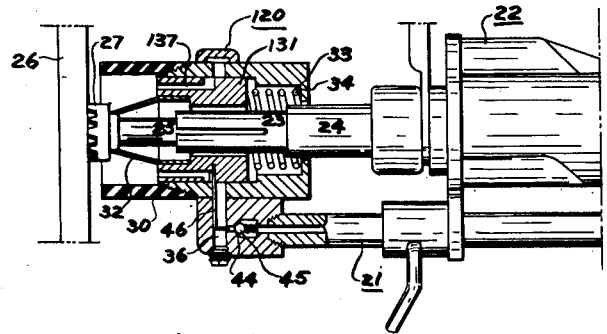

United States Patent Office 2,790,066
Patented Apr. 23, 1957

2,790,066

STUD WELDER

Clyde H. Haynes and Lorenz John Mowry, Elyria, Ohio, assignors to Gregory Industries, Inc., Detroit, Mich., a corporation of Michigan Application August 13, 1954, Serial No. 449,691

16 Claims. (Cl. 219—98)

This invention relates to the art of arc welding studs, particularly aluminum alloy studs, and has particularly to do with an improved stud welding gun.

In arc welding aluminum studs to a backing member such as an aluminum plate, it has been found that it is practically essential to blanket the end of the stud and the surrounding portions of the plate with an atmosphere of inert gas such as helium or argon in order to prevent oxide formation and the resultant production of porous and weak welds.

In welding such studs to a plate the customary practice is to surround the end of the stud with a ceramic ferrule which forms a dam for the weld metal and confines the weld metal to the desired area. It has heretofore been proposed to blanket the end of the stud with an inert gas by forcing the gas under pressure as a stream axially along the stud and into the ferrule, the gas under pressure escaping around the rim of the ferrule where it contacts the work.

I have found that when arc welding studs, particularly aluminum studs, in an atmosphere of inert gas, the welds produced are most satisfactory when the ferrule itself is enclosed in a bath of inert gas which has no appreciable pressure behind it. When the inert gas is in the form of a bath which surrounds the end of the stud and the ferrule, as distinguished from a stream of gas under substantial pressure flowing through the ferrule, there are no pressure forces exerted by the gas on the arc which cause the arc to move around and also create an unstable arc; and at the same time, a more complete surrounding of the whole welding area with inert gas is assured.

I have found that good results can be obtained when gas is flowed into the area or space around the outside of the ferrule through the vents in the ferrule and is exhausted along the stud. This feature permits the use of a gas shield which includes a valve for controlling the flow of the inert gas.

It is, therefore, an object of this invention to produce an inert gas shield for use in stud welding which includes a gas valve.

A further object of the invention is to provide an inert gas shield for stud welding which directs the gas in a direction parallel with the plate radially in towards the stud being welded and then exhausts the gas in a direction along the stud and away from the end which is to be welded.

A still further object of the invention is to provide an inert gas shield which may be readily attached to a conventional stud welding gun.

Other objects and a full understanding of the invention will become apparent from the description and claims and the drawings in which:

Figure 7 is a sectional view of another modification of the inert gas shield;

Figure 8 is a sectional view along the line 8—8 of Figure 7;

Figure 9 is a sectional view of a modification of an inert gas shield with the valve in open position;

Figure 10 is a sectional view along the line 10—10 of Figure 9; and

Figure 11 is a sectional view of the inert gas shield of Figure 9 with the valve in closed position.

Although the inert gas shield may be used and attached to stud welding guns of various designs, it is illustrated here and described as attached to a stud welding gun such as that illustrated in Nelson Patent No. 2,413,189, and Evans Patent No. 2,416,915. The basic principle of stud welding in the present invention is the same as that described in connection with the Nelson and Evans patents insofar as the time of duration of an arc and the movement of the stud relative to the plate is concerned. The ferrule which is preferred for the present invention is similar to that illustrated in Nelson Patent No. 2,416,204. The basic principle used in stud welding studs to plates in an inert gas is further described in a patent application, Serial Number 304,991, filed August 18, 1952, issued as Patent 2,727,123 on December 13, 1955, by George E. Gregory, Jr., entitled "Stud Welder."

Figure 2:
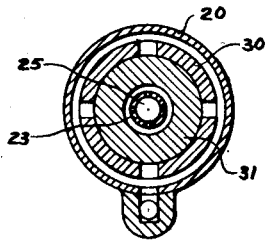
Figure 2 is a sectional view along the line 2—2 of Figure 1.
Figure 1:
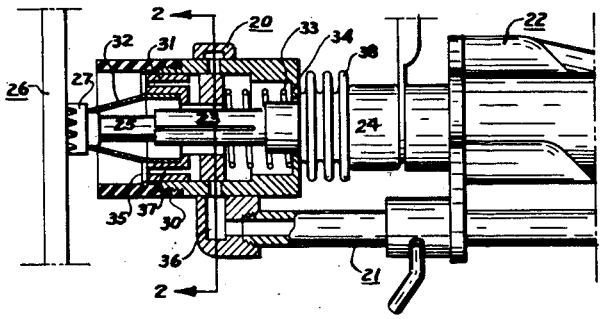
Figure 1 is a sectional view of an inert gas shield attached to the end of a stud welding gun with the valve in closed position.
Figure 4:
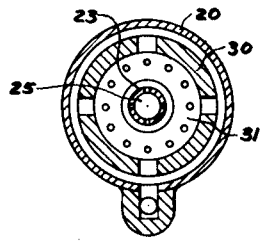
Figure 4 is a sectional view along the line 4—4 of Figure 3.

In the device illustrated in Figure 1 an inert gas shield 20 is supported by a leg 21 on stud welding gun 22. The gun 22 has the standard stud holding chuck 23 mounted in a stud carrier 24 for supporting a stud 25 to be welded to a work plate or work piece 26 within a ferrule 27.

The inert gas shield includes a hollow member or shield 30 alignable with the work piece 26 and defining a gas chamber. Slidable in this hollow member 30 is a valve member 31 carrying a ferrule holder 32 for holding the ferrule 27. The valve member 31 is urged in an outward direction towards the work piece by a spring 33 positioned between the end of the valve member 31 and an internal shoulder 34 on the hollow member 30. The outward movement of the valve member 31 is limited by a stop 35 on the hollow member 30.

The hollow member 30 which is mounted on the end of the leg 21 has a gas conduit 36 extending therearound and through the wall thereof at spaced intervals. In this instance the leg 21 has been constructed of tubing and may be attached to a suitable source of inert gas for supplying the gas to the conduit 36. Similarly the valve member 31 has gas conduit 37 which is alignable with the gas conduit 36 to permit gas to flow from the hollow member 30 through the valve member 31 and into the vicinity of the ferrule 27. In Figure 1 the conduit 37 in the valve member 31 is illustrated out of alignment or in closed valve position with the conduit 36 in the hollow member 30. The spring 33 normally holds the valve in this closed position.

Figure 3:
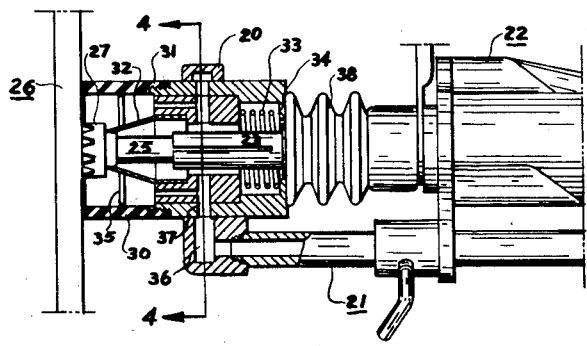
Figure 3 is a sectional view of the same valve as in Figure 1 with the valve in open position.

In this structure, as illustrated in Figures 1 and 3, the conduit 37 in the valve member 31 directs gas both on the outside of the ferrule holder 32 and on the inside of the ferrule holder 32 to bathe the ferrule in inert gas during welding of the stud. The gas can escape between the rough surface of the plate 26 and the abutting end of the hollow member 30. The abutting end of hollow member 30 is preferably constructed of a dielectric material. Since the gas is directed also into the ferrule holder 32, a closure bellows 38 is inserted between the hollow member 30 and the stud carrier 24 to prevent escape of the gas too fast. This bellows 38 may be constructed of rubber or any other suitable bellows material which will give it the resiliency and flexibleness necessary.

In using the device the operator simply fastens the shield 20 with its leg 21 to the stud welding gun 22. He then inserts a stud 25 in the chuck 23 and a ferrule 27 in the ferrule holder 32. Pressing the gun towards the work plate 26, seats the hollow member 30 against the work plate 26 to open the valve and allow gas to flow into the space around the ferrule to bathe the ferrule and the welding end of the stud. After the gun has been pressed against the work piece, the actual welding operation is the same as described in the previously mentioned patents.

Figure 5:
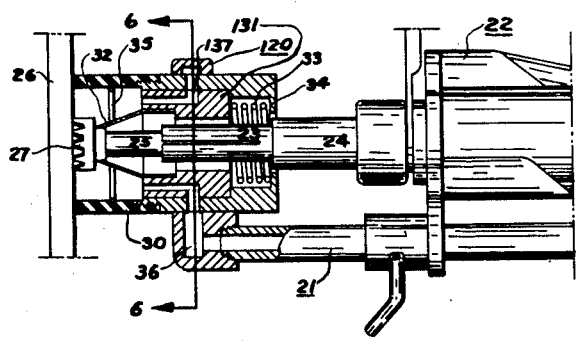
Figure 5 is a sectional view of a modification of the inert gas shield.

In the device illustrated in Figure 5 an inert gas shield 120 is supported by a leg 21 on stud welding gun 22. The gun 22 has the standard stud holding chuck 23 mounted in a stud carrier 24 for supporting a stud 25 to be welded to a work plate or work piece 26 within a ferrule 27.

The inert gas shield includes a hollow member or shield 30 alignable with the work piece 26 and defining a gas chamber. Slidable in this hollow member 30 is a valve member 131 carrying a ferrule holder 32 for holding the ferrule 27. The valve member 131 is urged in an outward direction towards the work piece by a spring 33 positioned between the end of the valve member 131 and the internal shoulder 34 on the hollow member 30. The outward movement of the valve member 131 is limited by a stop 35 on the hollow member 30.

The hollow member 30 which is mounted on the end of the leg 21 has a gas conduit 36 extending therearound and through the wall thereof at spaced intervals. In this instance the leg 21 has been constructed of tubing and may be attached to a suitable source of inert gas for supplying the gas to the conduit 36. Similarly the valve member 131 has gas conduit 137 which is alignable with the gas conduit 36 to permit gas to flow from the hollow member 30 through the valve member 131 and into the vicinity of the ferrule 27. In Figure 5 the conduit 137 in the valve member 131 is illustrated in alignment or in open valve position with the conduits 36 in the hollow member 30. The spring 33 normally holds the valve in closed position.

Figure 6:
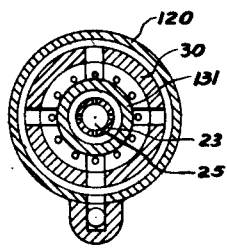
Figure 6 is a sectional view along the line 6—6 of Figure 5.

In this structure as illustrated in Figures 5 and 6 the conduit 137 in the valve member 131 directs gas on the outside of the ferrule holder 32 to bathe the ferrule in inert gas during welding of the stud. The gas flows very slowly from the space outside the ferrule 27 through the vents and into the ferrule in a direction parallel to the work piece and radially inwardly towards the stud 25 or an arc between the stud and the work piece 26. The gas then escapes from the vicinity of the ferrule in a direction generally parallel to the stud 25 and away from the work piece. The primary gas escape from the shield 120 of Figure 5 would thus be the opening between shoulder 34 on the hollow member 30 and the chuck 23 or chuck holder 24.

In using the device the operator simply fastens the shield 120 with its single leg 21 to the stud welding gun 22. He then inserts the stud 25 in the chuck 23 and a ferrule 27 in the ferrule holder 32 pressing the gun towards the work plate 26, seats the hollow member 30 against the work plate 26 to open the valve and allow gas to flow into the space around the ferrule to bathe the ferrule on the welding end of the stud. After the gun has been pressed against the work piece, the actual welding operation is the same as described in the previously mentioned patents.

The device illustrated in Figure 7 operates very similar to that of Figure 5. In this device the inert gas shield 220 is supported by a leg 221 on a stud welding gun 22. The gun has the standard stud holding chuck 23 mounted in a stud carrier 24 for supporting a stud 25 to be welded to a work plate 26 within a ferrule 27. The inert gas shield includes a hollow member of a shield 230 alignable with the work piece 26 and defining the gas chamber. Slidable in this hollow member 230 is a valve member 231 carrying a ferrule holder 32 for holding the ferrule 27. The valve member 231 is urged in an outward direction towards the work piece by a spring 33 positioned between the end of the valve member 231 and an internal shoulder 234 on the hollow member 230. The outward movement of the valve member 231 is limited by a stop 235 on the hollow member 230.

The hollow member 230 which is mounted on the end of the leg 221 has a gas conduit 236 extending therearound on the internal surface thereof and connected to a gas inlet 240 adapted to be connected to a source of inert gas. Similarly the valve member 231 has a gas conduit 237 on the external surface thereof which is alignable with the gas conduit 236 to permit gas to flow into the vicinity of the ferrule 27. In Figure 7 the conduit 237 of valve member 231 is illustrated in alignment or in open valve position with the conduit 236 and the hollow member 230. The spring 33 normally holds the valve in closed position. Operation of the valve and the direction of the flow of the gases in this shield is similar to that previously described in connection with Figure 5.

In the modification of the device as illustrated in Figures 9 to 11, the basic parts as used in Figure 5 have been used. In addition to the valve illustrated in Figure 5 a ball check valve has been included in the conduit in the hollow member. The hollow member is provided with a ball valve seat 44 and a spring backed ball 45 seatable thereagainst. An operating member 46 carried by the valve member which supports the ferrule holder opens this ball check valve to unseat the ball 45 from the ball valve seat 44 as illustrated in Figure 9. The ball valve is shown in open position in Figure 9 and in closed position in Figure 11. The operation of the device is the same as that of Figure 5 insofar as the flow of gases to bathe the weld are concerned.

Although this invention has been described in its preferred form with a certain degree of particularity enabling others to reproduce the invention, it is understood that the present disclosure has been made by way of example and that numerous modifications and changes in the details may be resorted to without departing from the spirit and scope of the invention as defined in the claims which are made a part hereof.

The embodiments of the invention in which an exclusive property or privilege is claimed are defined as follows:

1. A stud welding device comprising, a stud welding gun body, a chuck slidable in said body for carrying a stud to be welded to a work piece, said body including a tubular shield surrounding said chuck and radially spaced from the chuck, said shield having a gas inlet in the wall thereof, a ferrule holder slidable in said shield to support a ferrule in welding position relative to the chuck, said holder having conduit means alignable with the inlet to conduct gas from the inlet to the vicinity of the ferrule and within the shield, said holder and said shield cooperatively defining a gas valve.

2. The structure of claim 1 including a flexible seal between said tubular shield and said chuck.

3. The structure of claim 1 including resilient means between the shield and the holder normally urging the holder to a position wherein the conduit is not aligned with the inlet.

4. A stud welding device comprising, a tubular shield seatable against a work piece, a chuck movable in the shield and adapted to carry a stud to be welded to the work piece at a site within the shield, a ferrule holder in the shield and movable relative to the chuck and the shield and aligned to hold a ferrule having passages at the end thereof seatable against a workpiece at the welding end of a stud in the chuck, said shield and said holder having cooperating means for directing gas into the space within the shield and around a ferrule held by the holder, said chuck and ferrule holder being radially spaced apart to permit gas to exhaust therebetween from the space between the shield and holder after it passes thru the passages in said ferrule.

5. The structure of claim 4 wherein said means includes a valve responsive to movement of the ferrule holder relative to the shield.

6. The structure of claim 4 wherein said means includes a valve consisting of an inlet in said shield and a portion of said holder slidably fitted to the shield to close and open said inlet upon movement of the holder relative to the shield.

7. The structure of claim 6 including resilient means between the shield and holder normally urging the holder to a position in which said portion closes said inlet.

8. The structure of claim 4 wherein said means includes a valve having a valve member mounted on the shield and a valve operator mounted on the holder and aligned to operate the valve member upon movement of the holder relative to the shield.

9. The structure of claim 8 including resilient means between the shield and holder normally urging the holder to a position closing said valve.

10. A device for welding a stud to a work piece at an inert gas shielded position, said device comprising, a ferrule alignable with a work piece to define said position, a chuck for holding the stud with the welding end in said ferrule, gas inlet housing around said ferrule and cooperating therewith to direct gas radially into said ferrule and said position in a direction generally perpendicular to the chuck to bathe the welding end of the stud, said housing and said ferrule having spaced surfaces providing gas outlet means directing gas away from said position in a direction parallel to and along said chuck, and pressure means directing gas under pressure into said gas inlet housing.

11. The structure of claim 10 including a valve responsive to movement of the ferrule relative to the chuck for controlling the flow of inert gas into said inlet housing.

12. The method of inert gas shielding a welding arc drawn between a work plate and the end of a stud comprising, directing inert gas in a direction parallel to the work piece and radially inwardly towards the arc, then directing said gas in a direction generally parallel to the stud and away from the work piece.

13. A stud welding device for welding ends of studs to a plate comprising, hollow inner and outer means in sliding engagement at one end thereof and in spaced relation at the other end thereof to form a gas chamber between the means when said other ends are pressed against a plate, a stud carrier movably mounted on one means and aligned to position the welding end of a stud carried thereby at said other end of the inner means, said means having cooperative portions defining a valved inlet into said chamber capable of entering gas into the chamber only when both the inner and outer means are engaging a plate to which a stud is being welded.

14. A stud welding device comprising a tubular shield, a chuck movably mounted on said shield for supporting a stud to be welded to a workpiece, said tubular shield surrounding the welding end of a stud supported by said chuck in radially spaced relation thereto, a member slidable in the shield and seatable against the work piece, said member and said shield having cooperating valve portions defining a valve capable of directing gas into the shield upon movement of the member relative to the shield by seating the member against the workpiece, said member including a ferrule seatable against the workpiece around the end of a stud in the chuck, said ferrule having gas conduit means extending radially of the chuck axis and capable of directing gas from the space between the member and the shield radially inwardly towards the welding end of the stud, said chuck and said member having cooperating surfaces spaced apart and extending parallel with the axis of the chuck and capable of directing gas from the welding end of a stud in the chuck to atmosphere.

15. A device for welding a stud to a work piece at an inert gas shielded position, said device comprising, a ferrule alignable with a work piece to define said position, a chuck for holding the stud with the welding end in said ferrule, gas inlet housing around said ferrule and cooperating therewith to direct gas radially into said ferrule and said position in a direction generally perpendicular to the chuck to bathe the welding end of the stud, said ferrule having an internal surface spaced from said chuck and thereby providing gas outlet means directing gas away from said position in a direction parallel to said chuck, and pressure means directing gas under pressure into said gas inlet housing.

16. A stud welding device comprising a tubular shield, a chuck movably mounted on said shield for supporting a stud to be welded to a work piece, said tubular shield surrounding the welding end of a stud supported by said chuck in radially spaced relation thereto, a member slidable in the shield and including a ferrule seatable against the work piece around the end of a stud in the chuck, said ferrule having gas conduit means extending radially of the chuck axis and capable of directing gas from the space between the member and the shield radially inwardly towards the welding end of the stud, said chuck and said member having cooperating surfaces spaced apart and extending parallel with the axis of the chuck and capable of directing gas from the welding end of a stud in the chuck to atmosphere.

References Cited in the file of this patent

UNITED STATES PATENTS

| | | |
|---|---|---|
| 2,315,502 | Crecca | Apr. 6, 1943 |
| 2,727,123 | Gregory | Dec. 13, 1955 |